(12) United States Patent
Gerald

(10) Patent No.: US 9,393,655 B1
(45) Date of Patent: Jul. 19, 2016

(54) STEADY REST

(71) Applicant: Marcantel Gerald, Tucson, AZ (US)

(72) Inventor: Marcantel Gerald, Tucson, AZ (US)

(*) Notice: Subject to any disclaimer, the term of this patent is extended or adjusted under 35 U.S.C. 154(b) by 158 days.

(21) Appl. No.: 14/487,822

(22) Filed: Sep. 16, 2014

Related U.S. Application Data

(60) Provisional application No. 61/881,528, filed on Sep. 24, 2013.

(51) Int. Cl.
*B23Q 1/76* (2006.01)
*B23B 23/04* (2006.01)

(52) U.S. Cl.
CPC . *B23Q 1/76* (2013.01); *B23B 23/04* (2013.01); *B23Q 1/763* (2013.01)

(58) Field of Classification Search
CPC .......... B23Q 1/76; B23Q 1/763; B23B 23/04; B23B 23/00; Y10T 82/2564; Y10T 82/2597; Y10T 82/2593; Y10T 82/2568; Y10T 82/27
USPC ................................................ 142/48, 49, 53
See application file for complete search history.

(56) References Cited

U.S. PATENT DOCUMENTS

| | | | | | |
|---|---|---|---|---|---|
| 1,239,027 | A | * | 9/1917 | Mentzer | B23B 23/02 142/53 |
| 1,401,131 | A | * | 12/1921 | Blackburn | B23Q 1/76 451/408 |
| 2,609,592 | A | * | 9/1952 | Shumaker | B23Q 1/76 29/57 |

* cited by examiner

*Primary Examiner* — Sunil K Singh
*Assistant Examiner* — Alan Snyder
(74) *Attorney, Agent, or Firm* — Cahill Glazer PLC

(57) ABSTRACT

A steady rest for use on a lathe is formed of a tailstock for mounting on an arbor and including a pair of diametrically opposed channels formed in the tailstock wherein each channel extends a pair of struts each slidably mounted within a different one of said channels, respectively, and securable within the channel to lock the respective strut in position, the struts extending from said tail stock toward the workpiece at an angle with respect to a rotary axis of the workpiece being machined. A pair of wheels each journaled on a different one of said struts are provided for contacting said workpiece.

5 Claims, 4 Drawing Sheets

STEADY REST

RELATED APPLICATIONS

This application is related to and claims priority to a provisional application entitled "LIVE CENTER STEADY REST" filed Sep. 24, 2013, and assigned Ser. No. 61/881,528.

FIELD OF THE INVENTION

The present invention relates to woodworking, and more particularly to woodturning apparatus.

BACKGROUND OF THE INVENTION

When operating a lathe to turn a workpiece, particularly when the workpiece being formed has a large flat or curved surface to be formed, the end of the turning operation on the lathe frequently results in a tenon remaining on the workpiece to be removed after the workpiece has been removed from the lathe. For example, when forming a bowl-shaped surface, the bottom center of the bowl would normally need to be removed from the lathe to remove the remaining tenon. The tenon is typically removed by chiseling, sawing, or simply breaking it off.

SUMMARY OF THE INVENTION

The present invention permits the removal of any such tenon while the workpiece remains mounted in the lathe. Lathing operations continue using conventional tools to remove the tenon without interference from any other support that may be used such as a live center that heretofore was used to maintain support for the workpiece during turning. The present invention provides retractable wheels contacting the workpiece to continuously support the workpiece and also permit the retraction of the live center's cone point if a live center is used.

BRIEF DESCRIPTION OF THE DRAWINGS

The present invention may more readily be described by reference to the accompanying drawings in which.

DETAILED DESCRIPTION OF THE INVENTION

Figure 1:
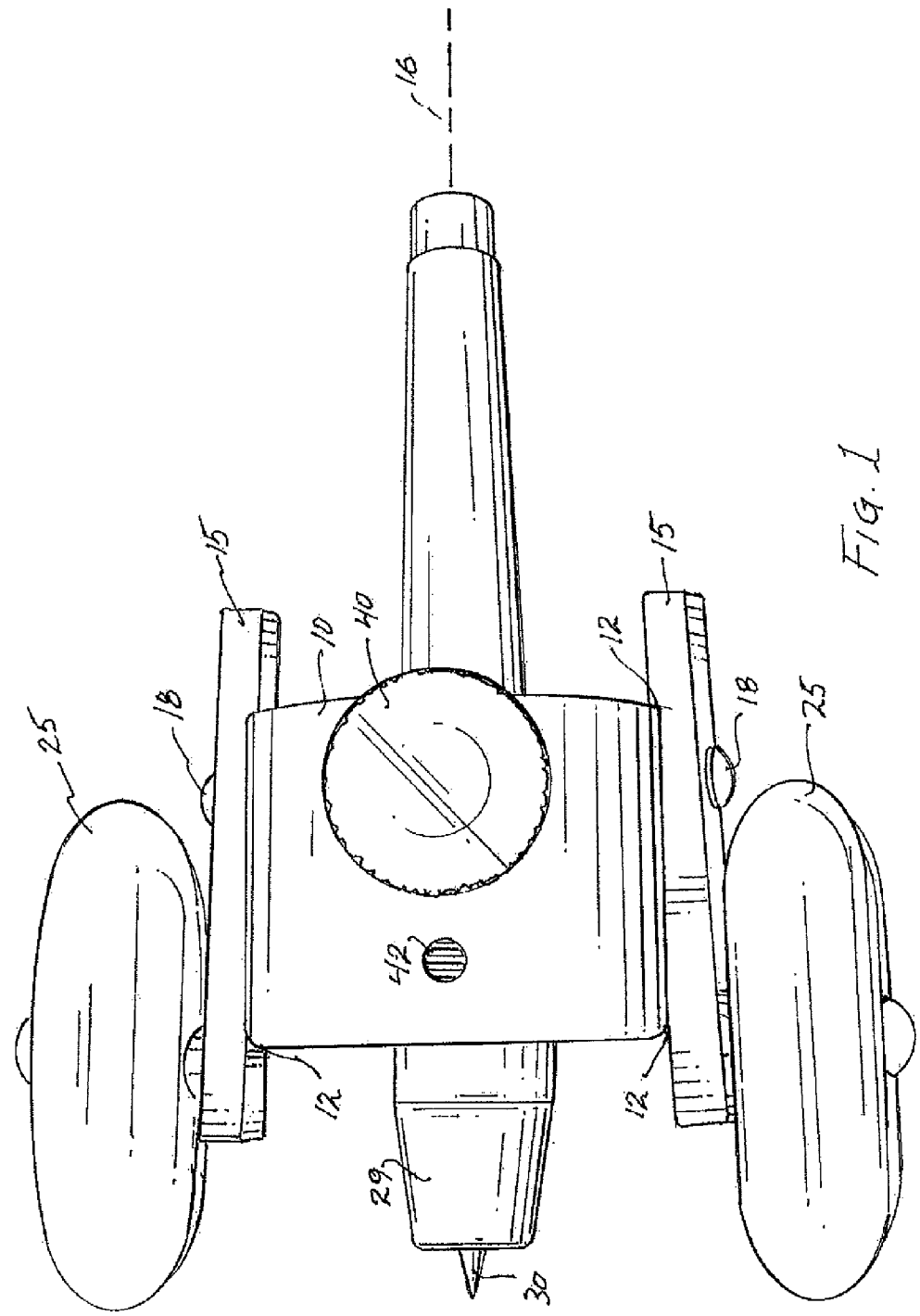
FIG. 1 is a top view of a steady rest incorporating the teachings of the present invention.
Figure 2:
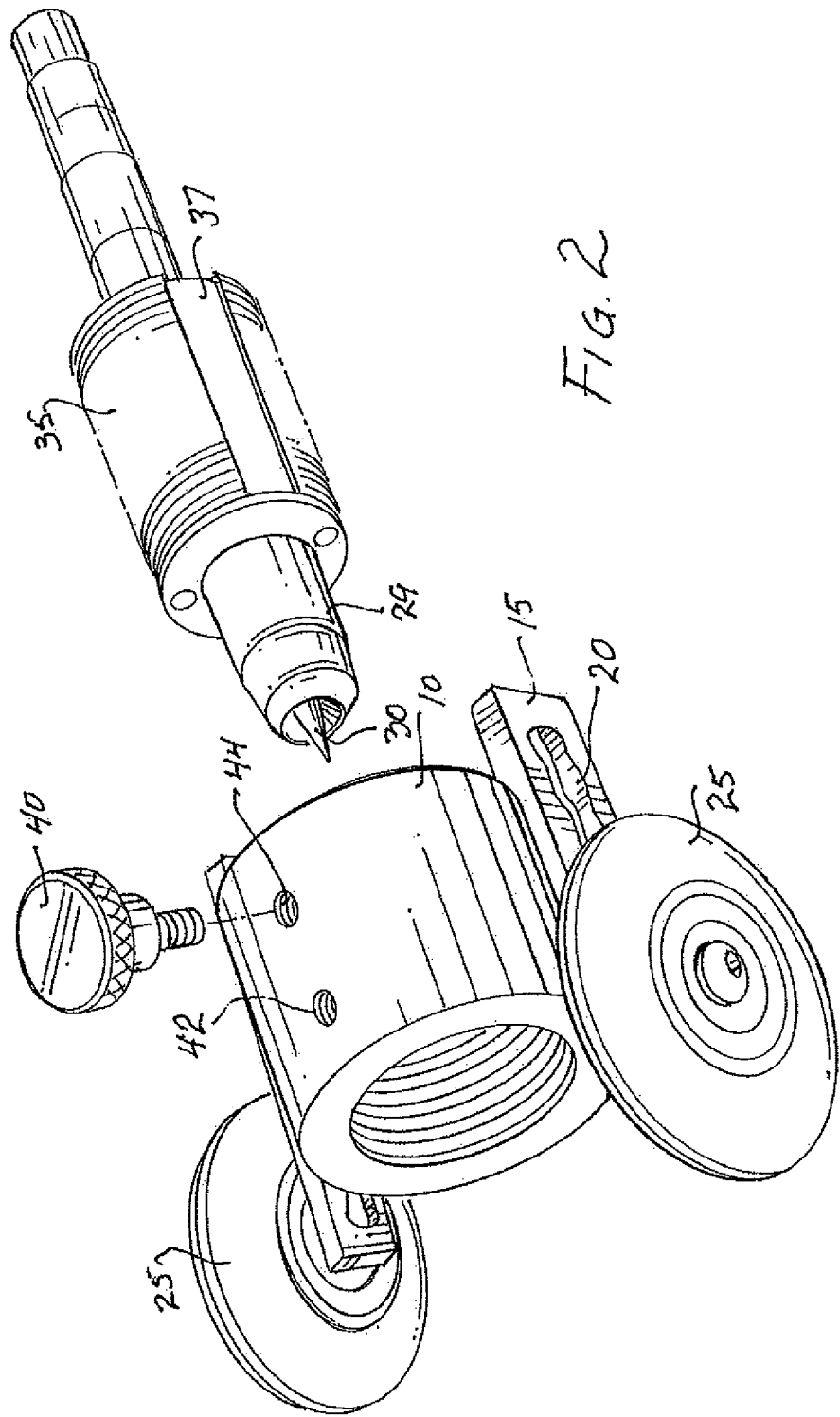
FIG. 2 is an exploded enlarged three-quarter front view of the steady rest of FIG. 1 with the knurled locking screw removed.
Figure 3:
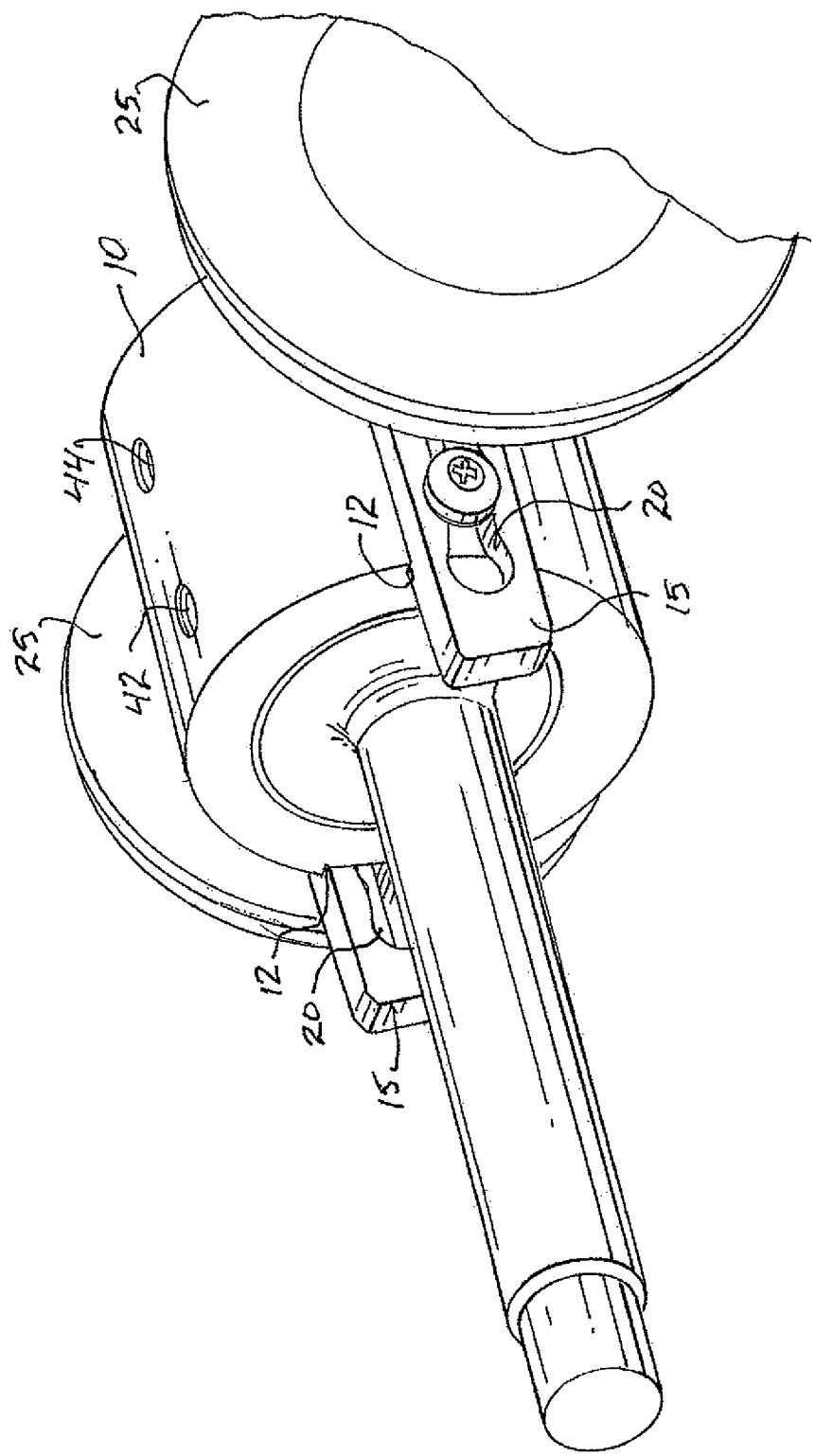
FIG. 3 is an enlarged three-quarter rear view of the steady rest of FIG. 1.

Referring to FIGS. 1 to 3, the embodiment of the invention incorporating a live center is shown. A tailstock is formed by an internally threaded cylindrical sleeve 10 provided with channels 12 machined diametrically opposed on either side of the sleeve 10. The channels 12 are rectangular in cross-section with longitudinal axis slightly inclined with respect to the rotary axis of the workpiece being machined and the axis of the cylindrical sleeve. That is, the channels extend to a greater depth in the cylindrical sleeve 10 at one end surface of the cylindrical sleeve to the opposing end of the cylindrical sleeve. These channels receive struts 15 that are slidably contained within the channels and may be moved generally longitudinally of the cylindrical sleeve toward or away from the workpiece. The increasing depth of the channels is best illustrated by the top view of FIG. 1 where it may be seen that the struts 15 are at an angle with respect to the longitudinal axis 16 of the cylindrical sleeve 10 and thus to the rotary axis of the workpiece being machined.

The struts 15 are retained in the corresponding channels by locking screws 18 that extend through holes or slots 20 provided in the struts 15. Thus, the struts may be positioned longitudinally of the threaded sleeve 10 and fixed in position by tightening the respective locking screws 18. At one end of each of the struts, a wheel 25 is journaled and is rotatably secured to the corresponding strut. When the struts are secured in their respective channels to the threaded sleeve, and the corresponding wheels are attached to the struts, the distance between the wheels may be adjusted by sliding the corresponding struts in their respective channels; that is, as the struts are extended to the left in FIG. 1, the distance between the corresponding wheels increases. Thus, the wheel-to-wheel distance may readily be adjusted by sliding the struts within their corresponding channels.

In the embodiment shown in FIGS. 1 to 3, a live center 29 is provided with a cone point 30 that is rotatable with respect to the remainder of the live center in a manner well known in the art. The live center includes a threaded cylinder 35 having a pair of opposing flats 37. The diameter of the cylinder and the pitch of the threads permit the threaded engagement of the cylinder 35 in the threaded sleeve 10. As the cylinder is threaded into the sleeve, the cone point 30 extends a greater or lesser distance out of the end of the threaded sleeve. The longitudinal position of the cone point may be fixed by a knurled locking screw 40 threadedly extending through locking holes 42 or 44 in the threaded sleeve 10 and engaging one of the flats 37 in the threaded cylinder 35.

In use, when for example a cylindrical tenon is to be removed from the surface of a workpiece, the knurled locking screw is loosened and the threaded cylinder is backed out of the threaded sleeve to permit the cone point to disengage the workpiece. The threaded sleeve, combined with the positioning of the struts thereon, is positioned with the wheels in contact with the workpiece. The wheels force the workpiece to remain engaged with a driving chuck plate or chuck mount while the cone point of the live center is withdrawn. This procedure thus exposes the cylindrical tenon to permit its removal using conventional woodturning tools. It thus becomes unnecessary to remove the workpiece to remove the tenon by sawing, chiseling, etc.

Figure 5:
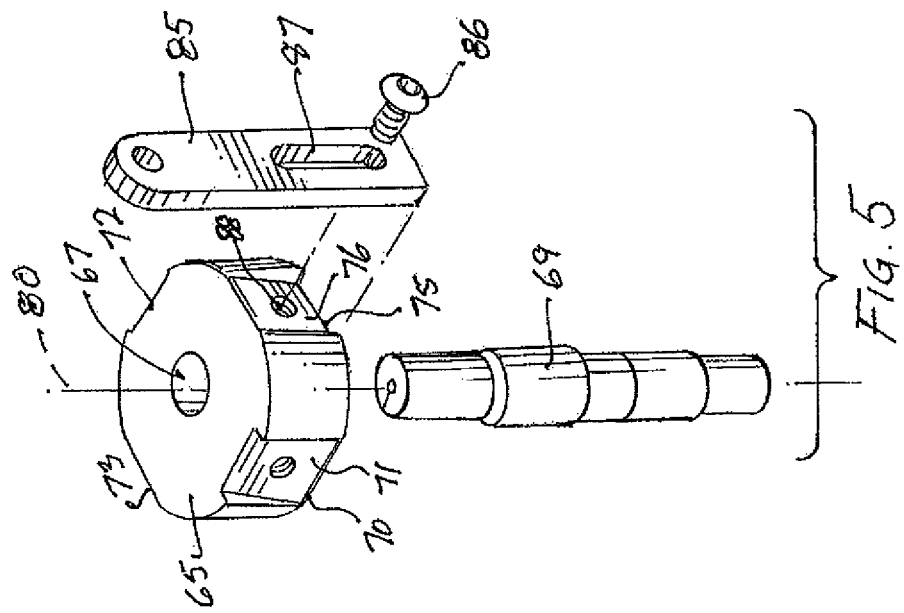
FIG. 5 is an exploded view of a portion of the alternative embodiment of FIG. 4.
Figure 4:
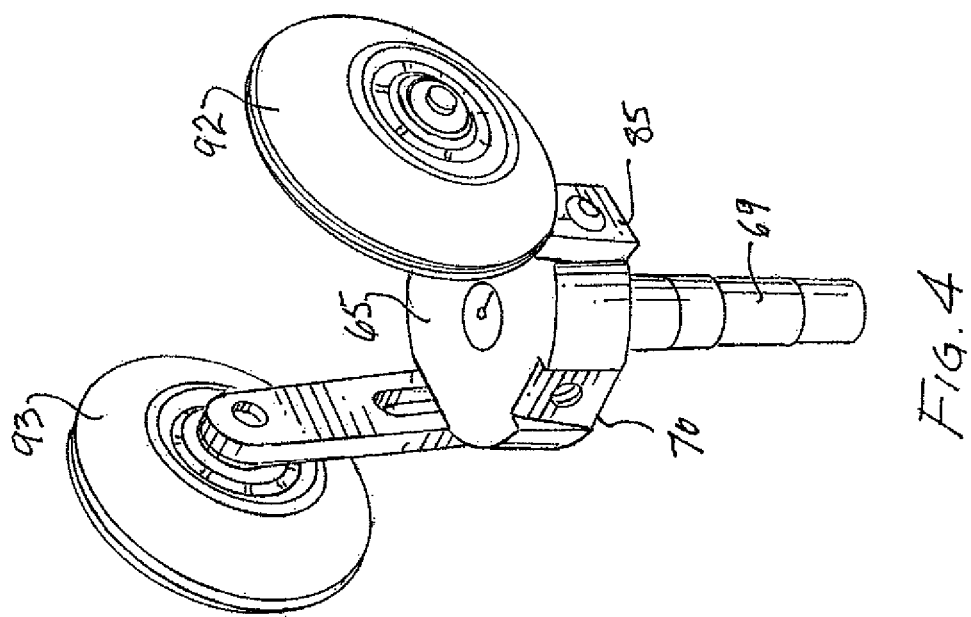
FIG. 4 is a perspective view of an alternative embodiment of the present invention.

Referring to FIGS. 4 and 5, an alternative embodiment of the present invention is shown. In this latter embodiment, the live center has been omitted and the tailstock is formed by a cylindrical disk 65 having a center cylindrical passage 67 to receive a chuck arbor 69 in a manner well known in the art. The disc 65 is provided with diametrically opposing pairs of rectangular channels 70-72 and 73-75. The channels are machined in the tailstock so that the bottom surface of the respective channel is slightly inclined with respect to the rotary axis 80 of the workpiece being machined. For example, it may be seen that the bottom surface 71 of channel 70 is inclined towards the axis 80 in the direction of a workpiece, while the bottom surface 76 of channel 75 is inclined away from the axis 80 in the direction of a workpiece. Thus, the diametrically opposed channels 70 and 72 incorporate bottom surfaces that are inclined slighted with respect to the axis 80 and are inclined toward the axis 80; in contrast, the diametrically opposed channels 73 and 75 have bottom surfaces that are inclined in the opposite direction. The surfaces of the channels 73 and 75 diverge from the axis 80 in the direction of a workpiece while the diametrically opposed channels 70 and 72 are inclined toward the axis 80 in the direction of a workpiece being machined. Thus, a strut 85 may be secured, for example, in the channel 76 by securing the locking screw 86 through the slot 87 into the threaded hole 88 provided in the tailstock which will result in the strut 85 extending upwardly from the tailstock slightly inclined away from the axis 80.

The wheel 92, secured to the strut 85, will thus be positioned as shown in FIG. 4; the distances between the wheels 92 and 93 are adjusted by loosening the corresponding locking screw and sliding the respective supporting strut within its corresponding channel and retightening the locking screws. If a shorter range of distances between the wheels 92 and 93 is required, the corresponding struts are moved from the diametrically opposed channels 73 and 76 to alternate opposing channels 70 and 72. Since their inclined surfaces of channels 70 and 72 are angled toward the axis 80, the distance between the wheels 92 and 93 will be less but will nevertheless still be adjustable. If it is determined that adjustment is not necessary, and that the selection of the diverging or converging surfaces of the respective channel pairs is sufficient, the slots in each of the struts may be eliminated and replaced by a single hole to receive the corresponding locking screw that will engage a mating threaded hole in the tailstock 65.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed:
1. A steady rest for use on a lathe for contacting a workpiece comprising:
   (a) a tailstock for mounting on an arbor to be supported on a lathe;
   (b) a pair of diametrically opposed channels formed in said tailstock, each channel extending at an angle with respect to a rotary axis of the workpiece being machined;
   (c) a pair of struts, each slidably mounted within a different one of said channels, respectively, and securable within the channel to lock the respective strut in position, the struts extending from said tailstock toward the workpiece; and
   (d) a pair of wheels each journaled on a different one of said struts, respectively, for contacting said workpiece.
2. The steady rest of claim 1 wherein said diametrically opposed channels have rectangular cross-sections and said struts extending from said tailstock toward the workpiece extend at a diverging angle with respect to a rotary axis of the workpiece being machined.
3. The steady rest of claim 1 wherein said tailstock is an internally threaded cylindrical sleeve and wherein a live center is secured to said tailstock by threadedly engaging said internal threads.
4. A steady rest for use on a lathe for contacting a workpiece comprising:
   (a) a tailstock for mounting on an arbor to be supported in a lathe;
   (b) a first pair of diametrically opposed channels formed in said tailstock, each of said first pair of channels extending at a diverging angle with respect to a rotary axis of the workpiece being machined;
   (c) a second pair of diametrically opposed channels formed in said tailstock, each of said second pair of channels extending at a converging angle with respect to a rotary axis of the workpiece being machined;
   (d) a pair of struts each slidably mounted within a different one of said channels, respectively, and securable within the channel to lock the respective strut in position, the struts extending from said tail stock toward the workpiece; and
   (e) a pair of wheels each journaled on a different one of said struts, respectively, for contacting the workpiece.
5. The steady rest of claim 4 wherein said tailstock comprises an internally threaded cylindrical sleeve and includes a live center secured to said tailstock by threadedly engaging said internal threads.

* * * * *